(12) United States Patent
Chen (10) Patent No.: US 8,416,721 B1
(45) Date of Patent: Apr. 9, 2013

(54) METHOD AND APPARATUS FOR ENHANCING THE POWER EFFICIENCY OF WIRELESS COMMUNICATION DEVICES

(76) Inventor: Marcellus Chen, Fremont, CA (US)

( * ) Notice: Subject to any disclaimer, the term of this patent is extended or adjusted under 35 U.S.C. 154(b) by 1381 days.

(21) Appl. No.: 11/857,655

(22) Filed: Sep. 19, 2007

(51) Int. Cl.
*H04B 7/00* (2006.01)
*H02J 7/02* (2006.01)
*H02M 11/00* (2006.01)

(52) U.S. Cl. ......... 370/310; 323/371; 363/142; 320/138

(58) Field of Classification Search .................. 370/310; 323/371; 320/138; 363/142
See application file for complete search history.

(56) References Cited

U.S. PATENT DOCUMENTS

| | | | |
|---|---|---|---|
| 7,142,829 B2 * | 11/2006 | Sung et al. | 455/101 |
| 8,090,414 B2 * | 1/2012 | Mickle et al. | 455/573 |
| 2007/0191074 A1 * | 8/2007 | Harrist et al. | 455/572 |
| 2008/0227478 A1 * | 9/2008 | Greene et al. | 455/522 |
| 2008/0290738 A1 * | 11/2008 | Greene et al. | 307/145 |
| 2009/0067198 A1 * | 3/2009 | Graham et al. | 363/8 |
| 2009/0067208 A1 * | 3/2009 | Martin et al. | 363/126 |
| 2009/0102296 A1 * | 4/2009 | Greene et al. | 307/149 |
| 2009/0200985 A1 * | 8/2009 | Zane et al. | 320/108 |

OTHER PUBLICATIONS

NXP Aero quad-band GSM/GPRS/EDGE radio front-ends AERO42xx, NXP, Apr. 2007, 4 pages, Document order No. 9397 750 15986, Netherlands.
Highly Integrated Radio with Transceiver and Transmitter Modules for GSM/GPRS/EDGE Applications, Polaris 2 Total Radio Module, RFMD, 2006, 2 pages, Greensboro USA.
Weldon, Jeffrey Arthur, High Performance CMOS Transmitters for Wireless Communications, Fall 2005, 245 pages, University of California, Berkeley, Berkeley, USA.

* cited by examiner

*Primary Examiner* — Chi Pham
*Assistant Examiner* — Ahmed Elallam
(74) *Attorney, Agent, or Firm* — Patterson & Sheridan, LLP (57) ABSTRACT

Method and system for enhancing the power efficiency of a first wireless device that includes an energy receiver. In one implementation, the method includes receiving a transmitted signal at the first wireless device, converting the transmitted signal into power through the energy receiver, and providing the power to the first wireless device.

16 Claims, 13 Drawing Sheets

METHOD AND APPARATUS FOR ENHANCING THE POWER EFFICIENCY OF WIRELESS COMMUNICATION DEVICES

FIELD OF THE INVENTION

This disclosure relates generally to electrical circuits, and more particularly to techniques for enhancing the power efficiency of a wireless communication device (referred to herein as "wireless device").

BACKGROUND OF THE INVENTION

Figure 1:
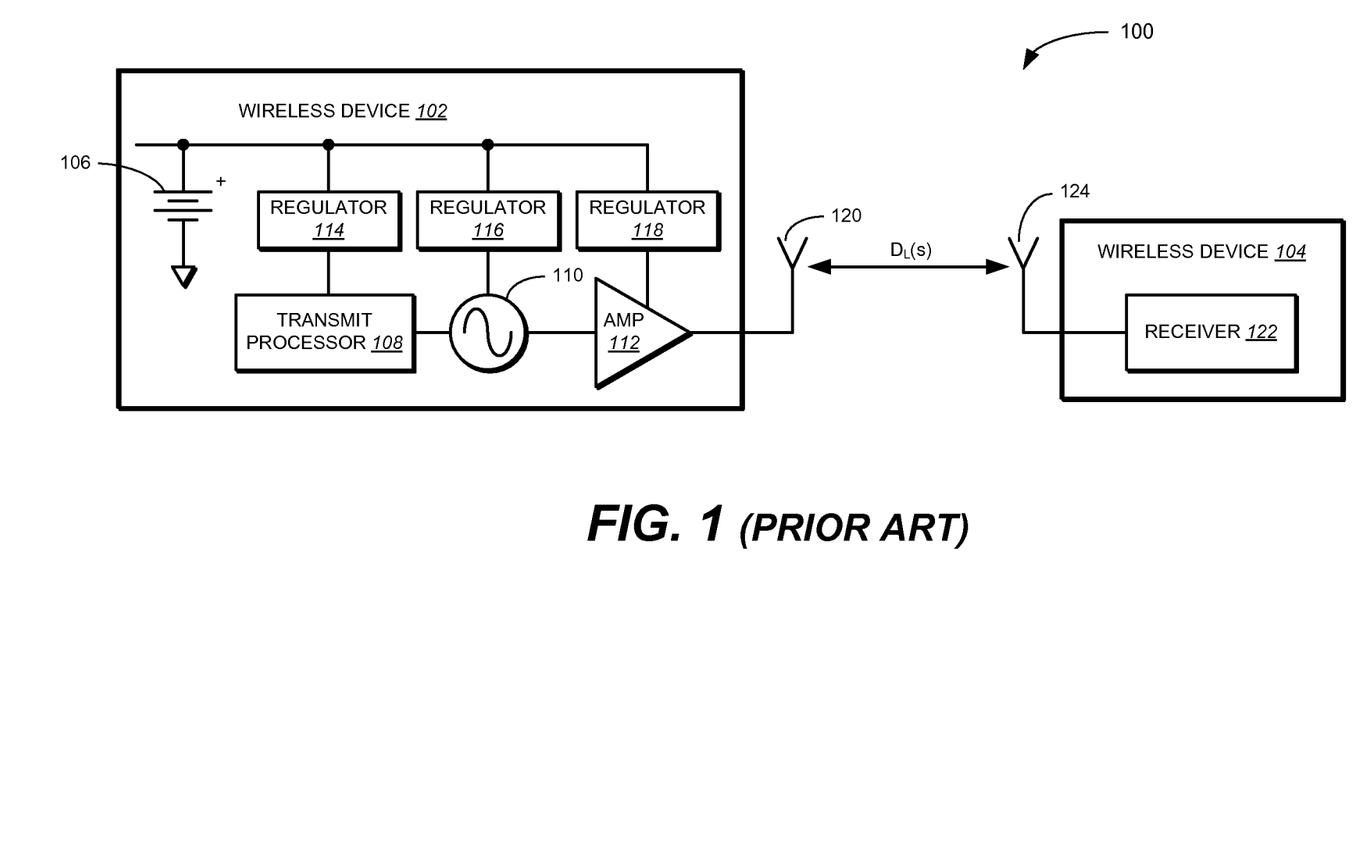
FIG. 1 is a block diagram of a conventional wireless communication system.

FIG. 1 illustrates a conventional wireless communication system 100 including wireless devices 102, 104. The wireless device 102 includes a DC power source 106 that provides power to a transmit processor 108, a modulator 110, and a power amplifier 112. The wireless device 102 further includes (optional) regulators 114, 116, 118 that respectively provide a correct voltage and/or current regulation to the transmit processor 108, the modulator 110, and the power amplifier 112. In operation, a transmit frequency (TX Fc, Fc(s)) of the transmit processor 108 is typically set to a specific frequency associated a wireless communication standard—e.g., GSM (global system for mobile communications), wireless LAN (local area network), Bluetooth, and the like. For example, the modulator 110 can comprise a voltage controlled oscillator and phase lock loop to select a given transmit frequency from a range of possible transmit frequencies. The power amplifier 112 amplifies a power of a modulated signal output from the modulator 110, and the output of the power amplifier 112 (referred to in the following Figs. as "TX Signal Power(s))" is transmitted through a transmit antenna 120 into free space. A receiver 122 of the wireless device 104 receives the radiated signal through a receive antenna 124 and processes the radiated signal, thus allowing wireless communication of information between the wireless device 102 and the wireless device 104.

In general, because wireless devices are not connected through a physical wire, signals that are transmitted from a wireless device are typically attenuated (reduced) and/or distorted due to travel in free space. Therefore, as a distance $D_L(s)$ (ranging from, e.g., 0 miles to millions of miles) increases between the wireless device 102 and the wireless device 104, an amount of attenuation and/or distortion of signals transmitted from the wireless device 102 to the wireless device 104 also increases. For example, a GSM cellular phone can transmit a signal having a power that averages 1-2 Watts, however, a GSM receiver typically receives a signal having a power as small as 60×10-12 Watts—most of the signal power is lost in free space. Attenuation and/or distortion of a signal can cause an amplitude of a signal to be too low or too distorted for correction by the wireless device 104.

SUMMARY OF THE INVENTION

In general, this specification describes a method for enhancing the power efficiency of a first wireless device that includes an energy receiver. The method includes receiving a transmitted signal at the first wireless device, converting the transmitted signal into power through the energy receiver, and providing the power to the first wireless device.

Implementations can include one or more of the following features. The transmitted signal can be a time variant signal having a pre-determined frequency, and converting the transmitted signal into power can include setting a frequency of the energy receiver substantially to the pre-determined frequency of the time variant signal. Setting the frequency of the energy receiver substantially to the pre-determined frequency of the time variant signal can include calibrating the energy receiver to substantially match the pre-determined frequency of the time variant signal using one or more pre-calibrated control signal values. The pre-determined frequency can be associated with one or more wireless communication standards selected from the group of GSM, CDMA, WCDMA, Bluetooth, or IEEE 802.11. Converting the transmitted signal into power can further include converting AC power associated with the time variant signal into DC power through an AC to DC converter. The transmitted signal can be a signal having been transmitted from the first wireless device. Converting the transmitted signal into power through the energy receiver can include determining an AC power associated with the signal through an electrical coupling of the energy receiver and a transmitter of the first wireless device. The electrical coupling between the energy receiver and the transmitter can be formed using one or more inductors, capacitors, wires, or traces. The transmitted signal can be a signal having been transmitted from a second wireless device that is separate from the first wireless device. The second wireless device can communicate in accordance with a different wireless communication standard than the first wireless device.

The first wireless device can be one of a cellular phone, a wireless headset, a personal digital assistant (PDA), a laptop or desktop computer, a router, or a key fob. The first wireless device can further include an electrical shield to absorb electromagnetic interference (EMI), and the method can further include converting the electromagnetic interference (EMI) absorbed through the electrical shield into power through the energy receiver. Converting the transmitted signal can include setting a frequency of the energy receiver substantially to a centered frequency of a pre-determined frequency range. Providing the power to the first wireless device can include providing the power to a component of the first wireless device. The component can be one of a touch pad, a light, a display screen, a digital signal processor, a receiver, a transmitter, or a battery.

In general, in another aspect, this specification describes a wireless device. The wireless device includes a transmitter to transmit a signal from the wireless device, and an energy receiver to converting the signal transmitted from the transmitter into power and provide the power to a component of the wireless device.

Particular implementations can include one or more of the following features. The signal transmitted from the transmitter can be a time variant signal having a pre-determined frequency, and the wireless device can further include a control circuit to set a frequency of the energy receiver to the pre-determined frequency of the time variant signal. The control circuit can be configured to set the frequency of the energy receiver to the pre-determined frequency of the time variant signal using one or more pre-calibrated control signal values. The energy receiver can further include an AC to DC converter to convert AC power associated with the time variant signal into DC power.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

This disclosure relates generally to electrical circuits, and more particularly to techniques for enhancing the power efficiency of a wireless communication device. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 2:
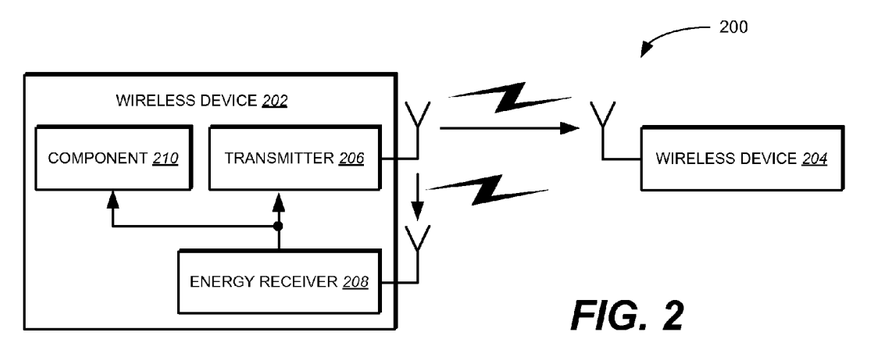
FIG. 2 is a block diagram of a wireless communication system including an energy receiver in accordance with one implementation.

FIG. 2 illustrates one implementation of a wireless communication system 200 including wireless devices 202, 204. The wireless devices 202, 204 can be any type of device operable to transmit a signal wirelessly—e.g., a cellular phone, a personal digital assistant (PDA), a wireless headset, a laptop or desktop computer, a router, a key fob, and the like. In one implementation, the wireless device 202 includes a transmitter 206 and an energy receiver 208. In one implementation, the energy receiver 208 converts a signal (transmitted from transmitter 206 to the wireless device 204) into power that is then provided back to, e.g., the transmitter 206 and/or another component 210 of the wireless device 202. The component 210 can be any function associated with the wireless device that requires power—e.g., a touch pad, a light (or backlight), a display screen, a digital signal processor, a receiver, a transmitter, a battery, and so on. In one implementation, the signal that is converted into power is a time variant (or AC) communication signal. Although the wireless device 202 is shown as including one transmitter and one energy receiver, the wireless device 202 can include any number of transmitters and energy receivers. The wireless device 204 can include a transmitter and an energy receiver (not shown). In one implementation, the energy receiver 208 is further operable to convert a signal transmitted from the wireless device 204 into power for use by the wireless device 202. In such an implementation, the wireless device 202 can receive power from the energy receiver 208 even when the transmitter 206 is not active.

Thus, the additional power provided by the energy receiver 208 can be used as a supplementary power source to a battery or other power source within the wireless device 202. In one implementation, the energy receiver 208 is frequency matched to a frequency of a transmitted signal to increase effectiveness of the energy receiver 208 so that the energy receiver 208 can capture a maximum amount of power from the transmitted signal.

Figure 3:
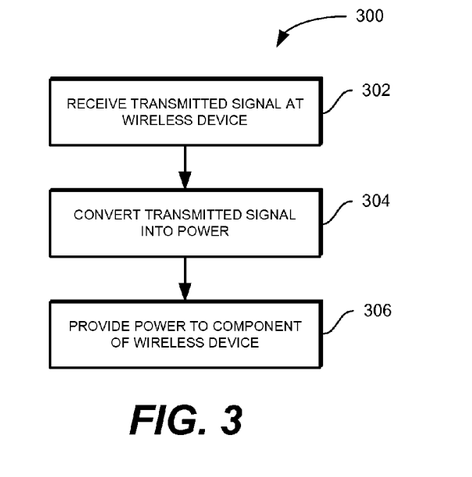
FIG. 3 depicts a method for enhancing the power efficiency of a wireless device using an energy receiver in accordance with one implementation.

FIG. 3 illustrates a method 300 for enhancing the power efficiency of a wireless device (e.g., wireless device 202) using an energy receiver in accordance with one implementation. A transmitted signal is received at the wireless device (step 302). In one implementation, the transmitted signal is a signal that was transmitted by the wireless device. In one implementation, the transmitted signal is a signal that was transmitted from a second device (e.g., wireless device 204) that is separate from the wireless device. In one implementation, the transmitted signal is a time variant communication signal. In one implementation, the time variant communication signal is a modulated signal having a specific frequency associated a wireless communication standard (e.g., GSM, CDMA (code division multiple access), WCDMA (wideband code division multiple access), Bluetooth, IEEE 802.11, and the like). The transmitted signal is converted into power (e.g., by the energy receiver) (step 304). In one implementation, the energy receiver includes an AC to DC converter to convert AC power from the transmitted signal into DC power. The power is provided to a component of the wireless device (step 306). As discussed above, the component can be any function associated with the wireless device that requires power. Generally, the power can be used to power functions or circuits within the wireless device, for example, the additional power can be used to charge (or extend the life of) a battery within the wireless device.

Figure 4:
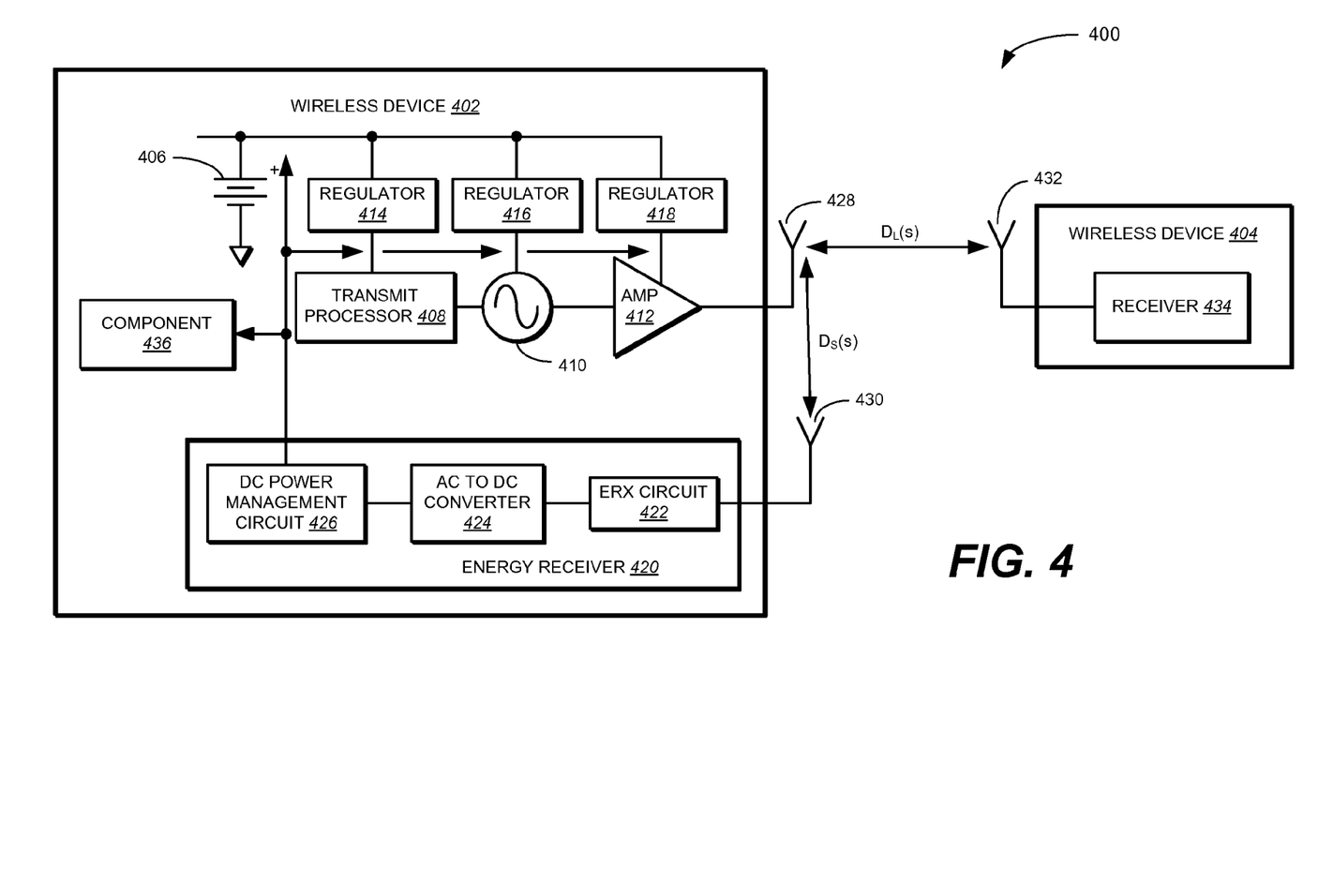
FIG. 4 is a block diagram of a wireless communication system including an energy receiver in accordance with one implementation.

FIG. 4 illustrates one implementation of a wireless communication system 400 including wireless devices 402, 404. In one implementation, the wireless device 402 includes a DC power source 406 that provides power to a transmit processor 408, a modulator 410, and a power amplifier 412. In one implementation, the wireless device 402 further optionally includes regulators 414, 416, 418 that respectively provide a correct voltage and/or current regulation to the transmit processor 408, the modulator 410, and the power amplifier 412. In one implementation, the DC power source 406 further provides power to a component 436 of the wireless device 202. The component 436 can be, for example, a touch pad, a light (or backlight), a display screen, a digital signal processor, a receiver, a transmitter, a battery, and so on. In one implementation, the wireless device 402 further includes an energy receiver 420 that includes an energy receiver (ERX) circuit 422 to receive a time variant communication signal and an AC to DC converter 424 to convert the received communication signal into DC power. The energy receiver 420 can further include a DC power management circuit 426 that can provide proper voltage levels of DC power to circuits (or components) within the wireless devices 402.

In one implementation, a distance ($D_S(s)$) between an antenna 428 and an antenna 430 (of the energy receiver 420) is much smaller relative to a distance ($D_L(s)$) between the antenna 428 and an antenna 432 (of a receiver 434 within the wireless device 404). In such an implementation, the antenna 430 (and energy receiver circuit 422) can be placed physically near the antenna 428 by design intention. Therefore, the energy receiver 420 can receive a signal transmitted from the antenna 428 having less attenuation and/or distortion compared a signal received by the antenna 432 of the wireless device 404. Operating characteristics associated with the (transmitter) antenna 428 and signals transmitted by the antenna 428 can be known at a time of manufacture and, therefore, during manufacture, a design of the antenna 430 of the energy receiver 420 can optimized to capture a maximum amount of signal transmitted through the antenna 428. The antenna 430 of the energy receiver 420 and other components of the energy receiver 420 can be designed and placed so as to not interfere with signals radiated to an intended remote wireless device antenna (e.g., antenna 432 of the wireless device 404).

Figure 5:
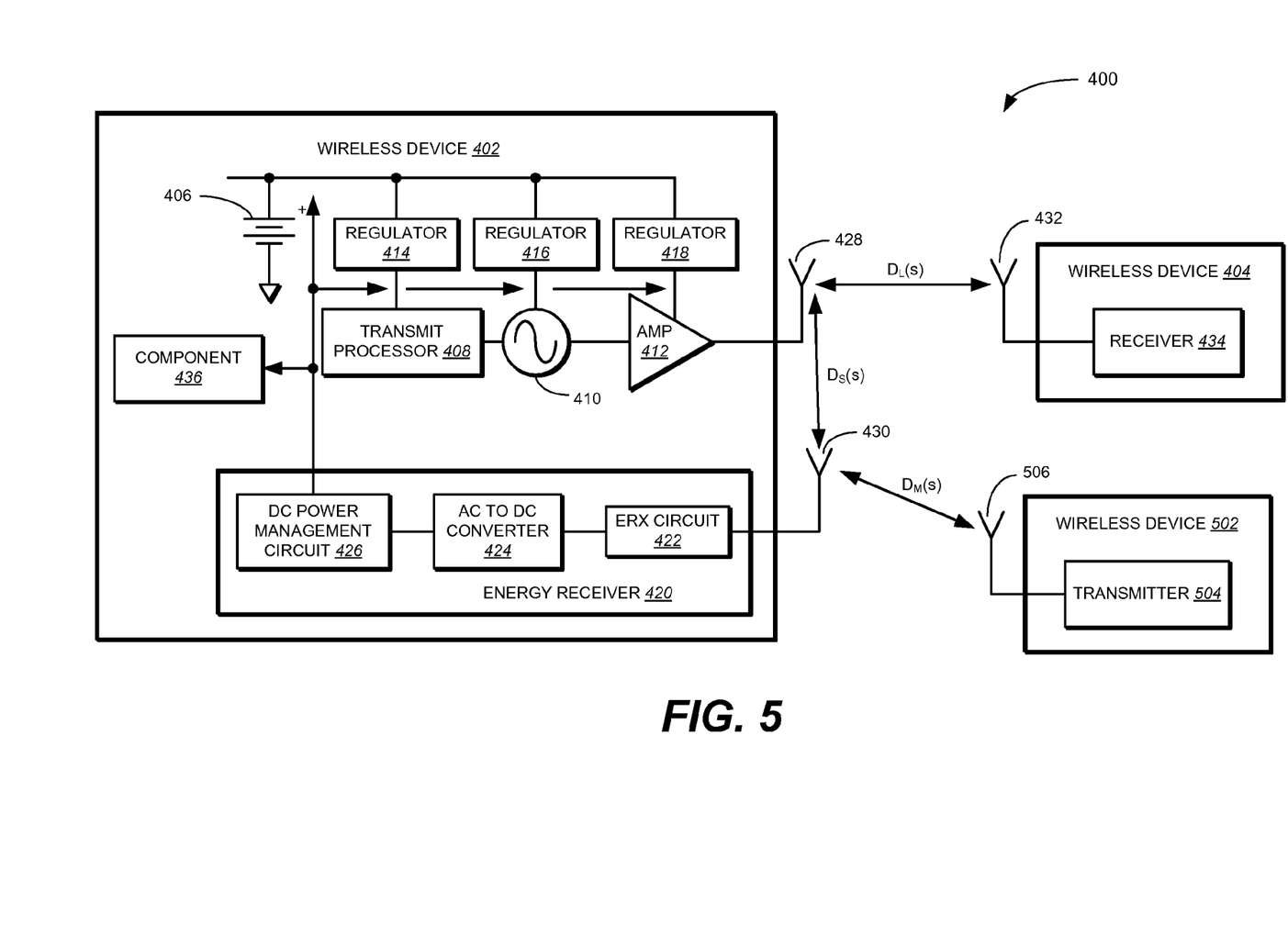
FIG. 5 is a block diagram of a wireless communication system including an energy receiver in accordance with one implementation.

FIG. 5 illustrates one implementation of the wireless communication system 400 further including a wireless device 502. As shown in FIG. 5, the wireless device 502 includes a transmitter 504 and an antenna 506 that is a distance $D_M(s)$ away from the antenna 430 of the energy receiver 420. In the implementation shown in FIG. 5, the energy receiver 420 is configured to also convert a transmitted signal from the wireless device 502 into DC power for use by the wireless device 402. The transmitted signal from the wireless device 502 can be a time variant signal associated with a same or different wireless communication standard as a signal transmitted by the wireless device 402.

Figure 6:
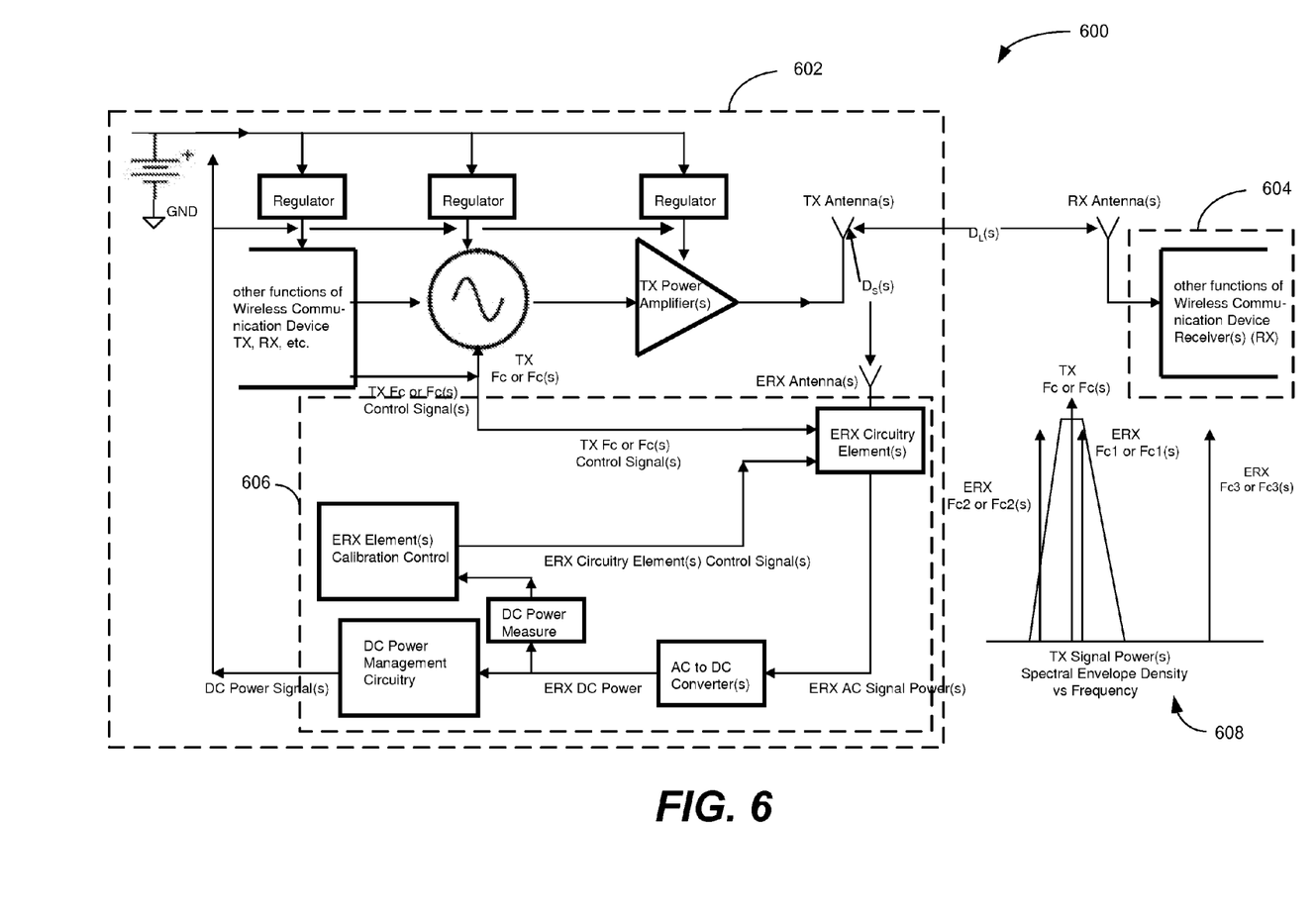
FIG. 6 is a block diagram of a wireless communication system including an energy receiver in accordance with one implementation.

FIG. 6 illustrates one implementation of a wireless communication system 600 including wireless devices 602, 604. The wireless device 602 includes an energy receiver 606. Each of the wireless devices 602, 604 include components similar to the wireless devices discussed above. In the implementation, of FIG. 6, the ERX Circuitry Element(s) (or energy receiver circuit) is set to the same (or nearly the same) frequency as that of the signal transmitted from a transmit antenna (TX Antenna(s)) of the wireless device 602. In one implementation, the frequency of the ERX Circuitry Element(s) is set based on a control signal—TX Fc or Fc(s) Control Signal(s). In one implementation, the energy receiver 606 includes a DC Power Measure circuit configured to measure a value of the ERX DC Power output from the AC to DC converter and an ERX Element(s) Calibration Control circuit uses the ERX DC Power measurement value to calibrate a frequency of the ERX Circuitry Element(s) so that the frequency substantially matches a frequency of a signal transmitted from a transmit antenna (TX Antenna(s)) of the wireless device 602.

During manufacture of a wireless device (e.g., wireless device 602), ERX Circuitry Element(s) may have component tolerance errors such that an energy receiver cannot achieve (or operate at) the same frequency as the frequency of a transmitted signal. If the frequency of the energy receiver does not match the frequency of a transmitted signal, the energy receiver may receive none or less than a maximum attainable amount of a transmitted signal. Thus, by adding an ERX Element(s) Calibration Control Circuit and corresponding calibration algorithm (discussed below in connection with FIG. 7), ERX Circuitry Element(s) within the energy receiver 606 can be made to match the frequency of a transmitted signal; therefore, the frequency of the energy receiver will lie within a transmit (TX) Signal Power Spectral Envelope; hence a maximum possible amount of a transmitted signal can be received by the energy receiver 606. For example, according to the graph 608 shown in FIG. 6, if the ERX Fc1 or Fc1(s) (the frequency of the energy receiver) lies within the TX Signal Power(s) Spectral Envelope, a maximum possible TX Signal Power(s) can be received; if the ERX Fc2 or Fc2(s) lies partially within the TX Signal Power(s) Spectral Envelope, less than a maximum possible TX Signal Power(s) can be received; and if ERX Fc3 or Fc3(s) lies outside of the TX Signal Power(s) Spectral Envelope, no TX Signal Power(s) can be received.

Figure 7:
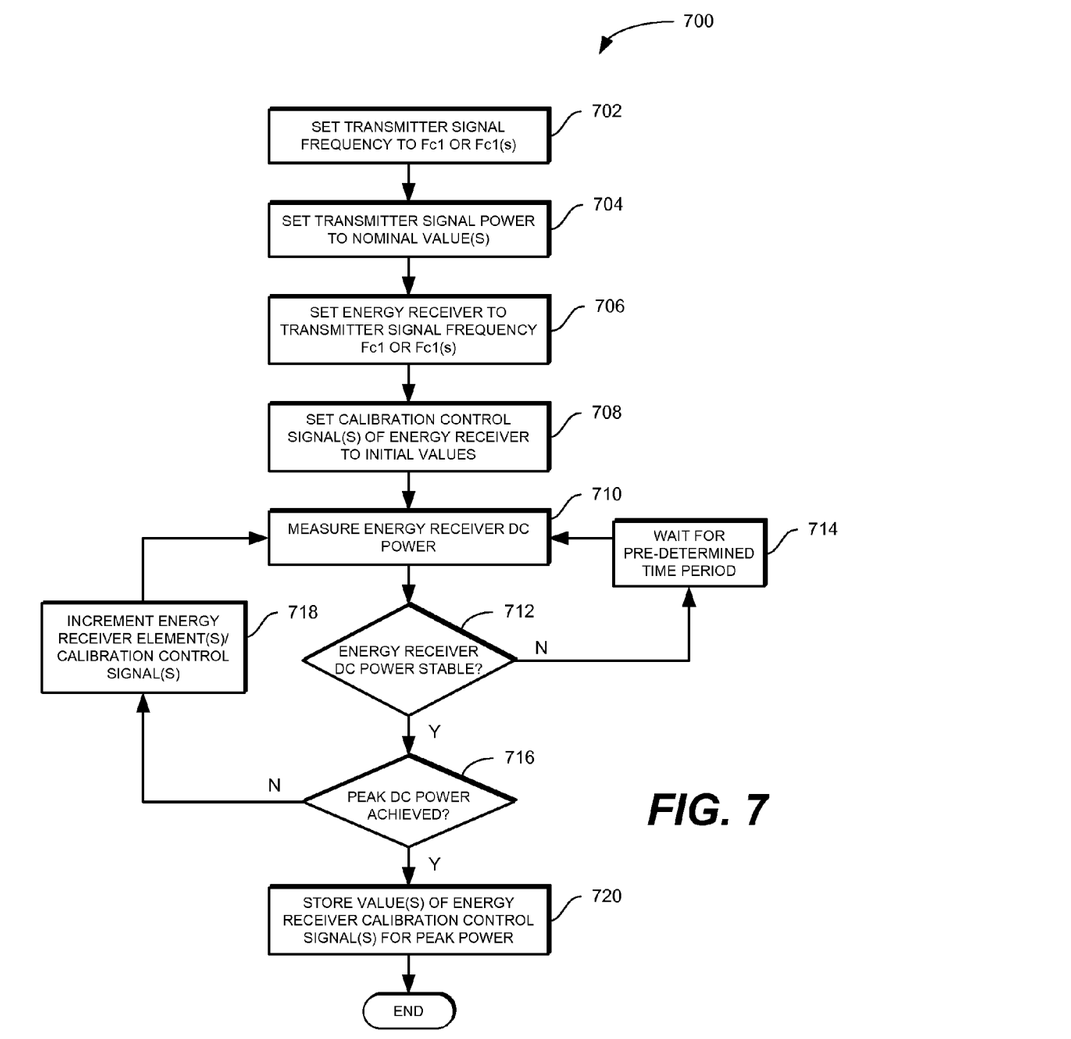
FIG. 7 depicts a calibration algorithm for determining peak power of a received signal in accordance with one implementation.

FIG. 7 illustrates one implementation of a calibration algorithm 700 that can be implemented to calibrate ERX Circuitry Element(s) within an energy receiver so that the frequency of the energy receiver can match the frequency of a signal transmitted from a transmitter of a wireless device. A transmitter signal is set to a pre-determined transmit frequency (Fc1 or Fc1(s) (step 702). Power level values in the transmitter signal are set to nominal values (step 704). The energy receiver is set to the pre-determined transmit frequency (Fc1 or Fc1(s) (step 706). The calibration control signal(s) of the energy receiver are set to initial values (step 708). A measurement of the ERX DC Power is performed (e.g., through DC Power Measure circuit of FIG. 6) (step 710). A determination is made whether the ERX DC Power is stable (step 712). If the ERX DC Power is not stable, the DC Power Measure circuit waits for a pre-determined amount of time before measuring a value of the ERX DC Power (step 714). If the ERX DC Power is stable, a determination is made whether a peak DC power level has been achieved (step 716). If the peak DC power level has not been achieved, the calibration control signal(s) of the energy receiver are incremented (step 718) and the algorithm 700 returns to step 710 to measure the ERX DC Power. If the peak DC power level has been achieved, then values of the calibration control signal(s) of the energy receiver are stored for use during operation.

The calibration algorithm 700 can be repeated for any transmit frequency Fc or Fc(s), and the calibration algorithm 700 can be repeated for multiple transmitters in the same wireless device. Thus, if a frequency of an energy receiver (ERX Fc or Fc(s)) does not match a transmit frequency (TX Fc or Fc(s)) of a transmitter, then the calibration algorithm 700 will ensure the correct Calibration Control Signal(s) Value(s) can be found and applied to ensure maximum received ERX DC Power.

Figure 8:
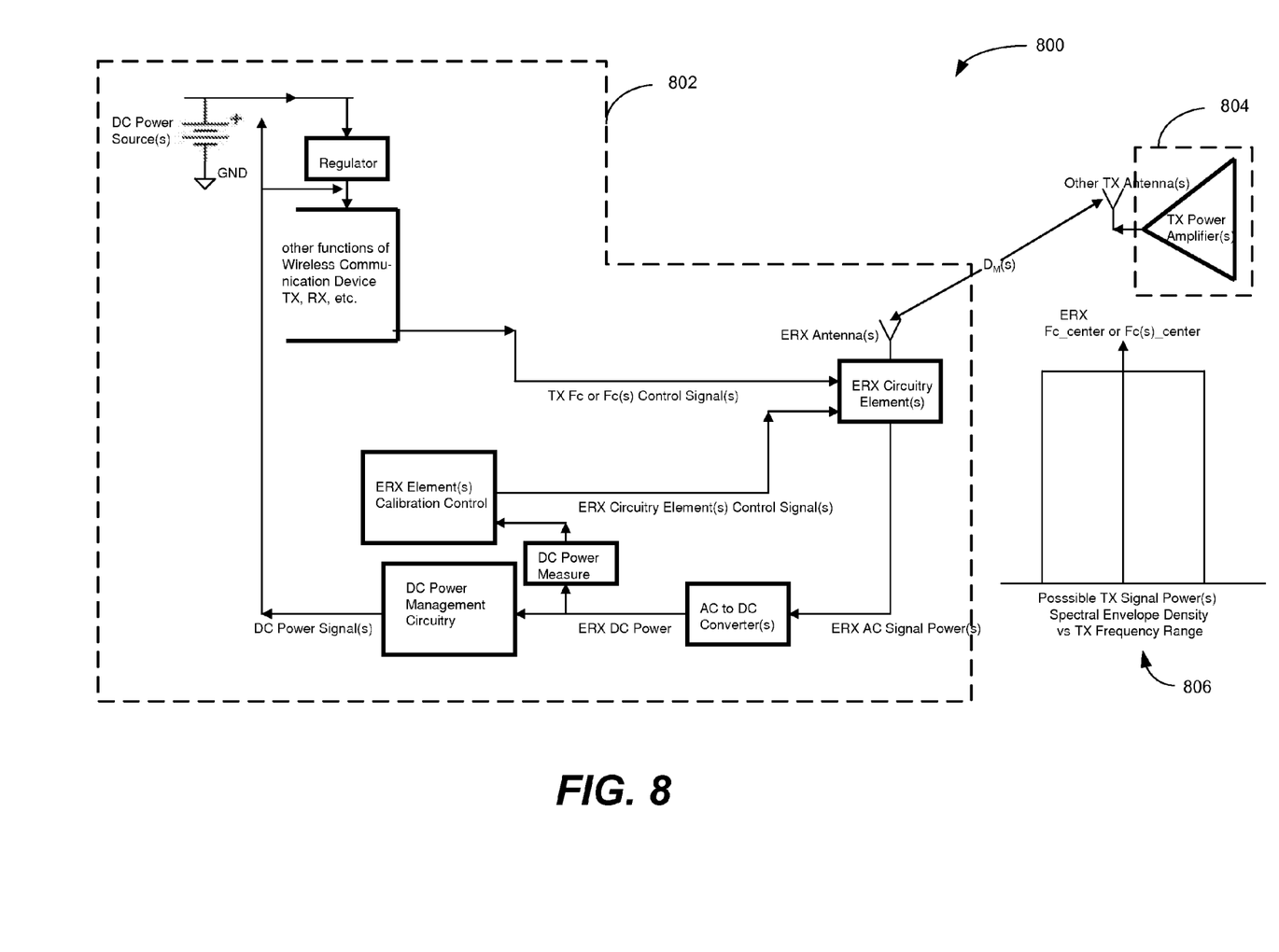
FIG. 8 is a block diagram of a wireless communication system including an energy receiver in accordance with one implementation.

FIG. 8 illustrates one implementation of a wireless communication system 800 including wireless devices 802, 804. In the wireless communication system 800, the transmitter of wireless devices 802 is inactive. In such a case, then the ERX Circuitry Element(s) can be set to the center of its own TX Frequency Range Fc_center or Fc(s)_center, with the ERX Element(s) Calibration Control Signal(s) Value(s) set for peak power. This will allow the energy receiver to receive a signal transmitted from a transmitter of another similar wireless device (e.g., wireless device 804). The received signal can be converted to DC Power to supply power to a component of the wireless device 802 having an inactive transmitter (or no transmitter).

Wireless communication standards generally occupy specific transmit (TX) frequency ranges, and a wireless device is likely to exist in an environment where other wireless devices employ the same and/or similar wireless communication standard. In such circumstances, this increases the probability of an energy receiver being able to receive signals transmitted from other wireless devices of the same and/or similar wireless communication standards. Thus, by setting the ERX Circuitry Element(s) to a TX Frequency Range Center and setting the ERX Element(s) Calibration Control Signal(s) to peak power value(s), the ERX will lie in the center of TX Signal Power(s) Spectral Envelope and, therefore, allow for increased probability of receiving a transmitted signal from other wireless devices. Such an approach possibly permits an energy receiver to receive signals transmitted from wireless devices operating in accordance with a different wireless communication standard. For example, as shown in the graph 806 of FIG. 8, the ERX Fc center or Fc1(s) center lies at the center of a TX Signal Power(s) Spectral Envelope for a given wireless communication standard. Alternatively, the ERX Element(s) TX Fc or Fc(s) Control Signal(s) and/or ERX Element(s) Control Signal(s) may be deliberately set to match and be calibrated to a frequency of signal transmitted by a nearby wireless device. The TX Fc or Fc(s) information can also be wirelessly transmitted to ERX Element(s) (as discussed in greater detail below).

Figure 9:
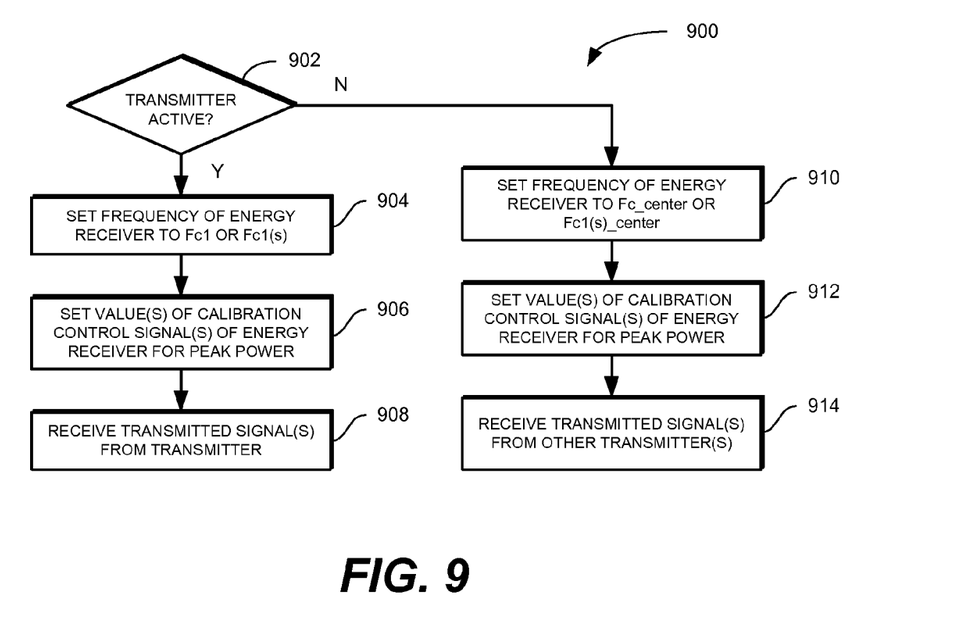
FIG. 9 depicts a method of operation for an energy receiver in processing received signals in accordance with one implementation.

FIG. 9 depicts a method 900 for setting a frequency of an energy receiver within a wireless device in accordance with one implementation. A determination is made whether a transmitter (e.g., within the same wireless device as the energy receiver) is active (step 902). If the transmitter is active, a frequency of ERX Circuitry Element(s) within the energy receiver is set to a same frequency as that of the transmitter (Fc1 or Fc1(s)) (e.g., by a functional circuit within the energy receiver) (step 904). One or more values of the calibration control signal(s) within the ERX Circuitry Element(s) are set for peak power (e.g., by an ERX Element(s) Calibration Control circuit) (step 906). Signal(s) transmitted by the transmitter is then received by the ERX Circuitry Element(s) (step 908). If, however, the transmitter within the same wireless device as the energy receiver is not active, a frequency of ERX Circuitry Element(s) within the energy receiver is set to a TX Frequency Range Center—Fc_center or Fc1(s)_center (e.g., by a functional circuit within the energy receiver) (step 910). One or more values of the calibration control signal(s) within the ERX Circuitry Element(s) are set for peak power (e.g., by an ERX Element(s) Calibration Control circuit) (step 912). Signal(s) transmitted by one or more transmitter(s) that are not within the same wireless device as the energy receiver are then received by the ERX Circuitry Element(s) (step 914).

Figure 10:
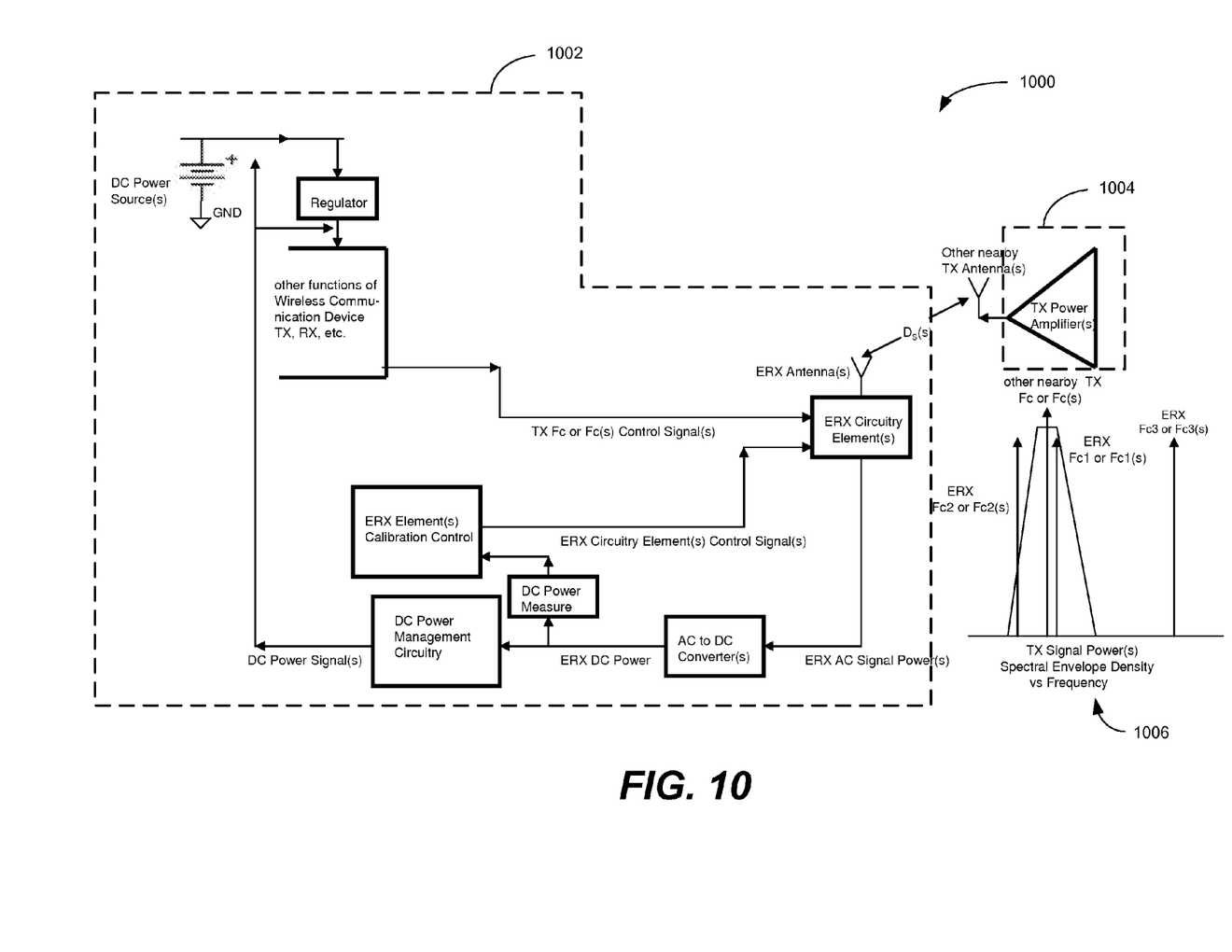
FIG. 10 is a block diagram of a wireless communication system including an energy receiver in accordance with one implementation.

FIG. 10 illustrates one implementation of a wireless communication system 1000 including wireless devices 1002, 1004. In the implementation shown in FIG. 10, the wireless device 1002 includes an energy receiver that is calibrated to match a transmit frequency of a transmitter within the wireless device 1004. In such a case, a signal transmitted from the wireless device 1004 may have a larger power relative to a signal transmitted from the wireless device 1002. Thus, ERX Element(s) TX Fc or Fc(s) Control Signal(s) and/or ERX Element(s) Control Signal(s) within an energy receiver may be deliberately set to match and be calibrated to a frequency of a transmitted signal (TX Signal Power(s)) of one or more nearby wireless devices (e.g., wireless device 1004). In one implementation, the transmit frequency information (TX Fc or Fc(s)) associated with nearby wireless devices can be wirelessly Transmitted to ERX Element(s) within the energy receiver of the wireless device 1002.

Accordingly, in a case in which a first wireless device generates a small amount of TX Signal Power(s) relative to the TX Signal Power(s) of a second wireless device, it may be more advantageous to have an energy receiver (ERX) within the first wireless device set and calibrated to receive signals transmitted from the second wireless device. For example, Bluetooth devices (2.4 GHz Tex. Frequencies) typically have an average TX Signal Power of $1\times10^{-3}$ Watt, $2.5\times10^{-3}$ Watt, or $100\times10^{-3}$ Watt, and cellular phone (800, 900, 1800, 1900 MHz TX Frequencies) typically have an average TX Signal Power of 1 Watt, 2 Watts, 5 Watts or more. If an energy receiver within a Bluetooth device is set and calibrated to receive TX Signal Power(s) of a nearby cellular phone, the energy receiver will be able to generate a larger amount of DC power from a received signal than if the energy receiver were set and calibrated to a transmit frequency of a Bluetooth device. For example, as shown in the graph 1006 of FIG. 10, if the ERX Fc1 or Fc1(s) lies within the TX Signal Power(s) Spectral Envelope of a nearby transmitter, a maximum amount of nearby TX Signal Power(s) can be received; if ERX Fc2 or Fc2(s) lies partially within the TX Signal Power(s) Spectral Envelope of a nearby transmitter, less than a maximum amount of nearby TX Signal Power(s) is attainable; and if ERX Fc3 or Fc3(s) lies outside the TX Signal Power(s) Spectral Envelope of a nearby transmitter, no nearby TX Signal Power(s) can be received. Alternatively, ERX Element(s) TX Fc or Fc(s) Control Signal(s) and/or ERX Element(s) Control Signal(s) may be deliberately set to match and be calibrated to TX Frequency Range Fc center or Fc(s) center of nearby wireless device(s), as discussed above.

Figure 11:
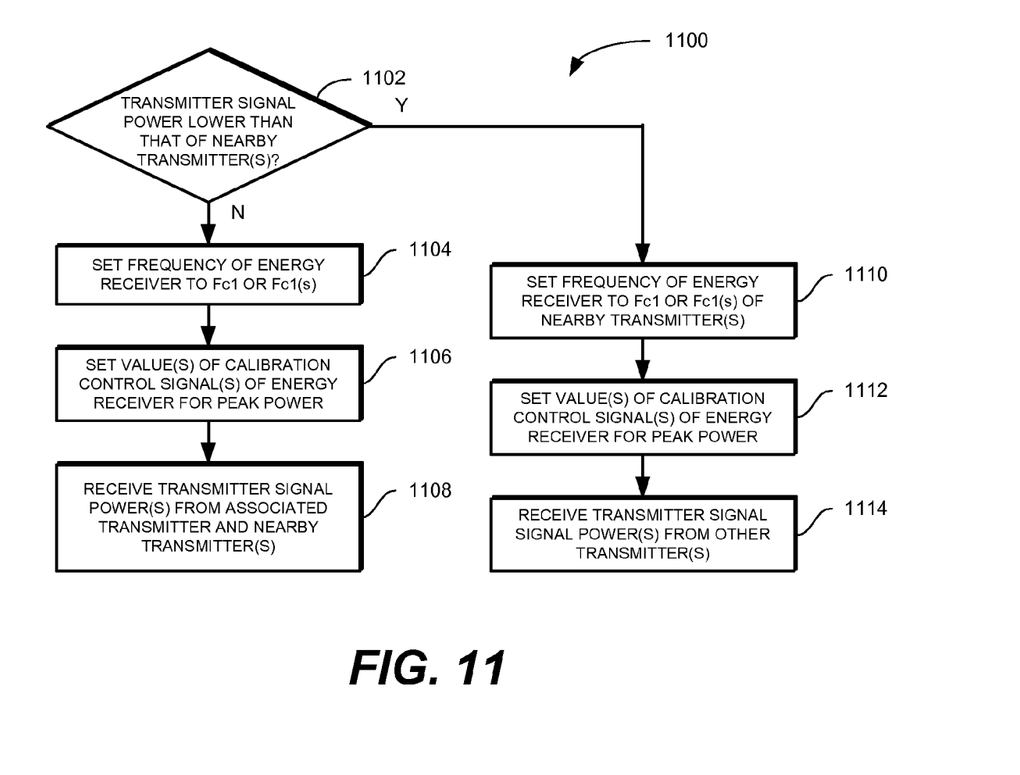
FIG. 11 depicts a method of operation for an energy receiver in processing received signals in accordance with one implementation.

FIG. 11 depicts a method 1100 for setting a frequency of an energy receiver within a wireless device in accordance with one implementation. A determination is made whether a power of a signal transmitted by a transmitter (e.g., within the same wireless device as the energy receiver) is lower than a power of a signal transmitted by another transmitter (e.g., a nearby transmitter) (step 1102). If the power of a signal transmitted by the transmitter (within the same wireless device as the energy receiver) is greater than the power of a signal transmitted by another transmitter, a frequency of ERX Circuitry Element(s) within the energy receiver is set to a same frequency as that of the transmitter (Fc1 or Fc1(s)) (e.g., by a functional circuit within the energy receiver) (step 1104). One or more values of the calibration control signal(s) within the ERX Circuitry Element(s) are set for peak power (e.g., by an ERX Element(s) Calibration Control circuit) (step 1106). Signal(s) transmitted by the transmitter is then received by the ERX Circuitry Element(s) (step 1108).

If, however, the power of a signal transmitted by the transmitter (within the same wireless device as the energy receiver) is not greater than the power of a signal transmitted by another transmitter, a frequency of ERX Circuitry Element(s) within the energy receiver is set to a same frequency as that of the other transmitter (Fc1 or Fc1(s)) (e.g., by a functional circuit within the energy receiver) (step 1110). One or more values of the calibration control signal(s) within the ERX Circuitry Element(s) are set for peak power (e.g., by an ERX Element(s) Calibration Control circuit) (step 1112). One or more signals transmitted by the other transmitter (not within the same wireless device as the energy receiver) are then received by the ERX Circuitry Element(s) (step 1114).

Figure 12:
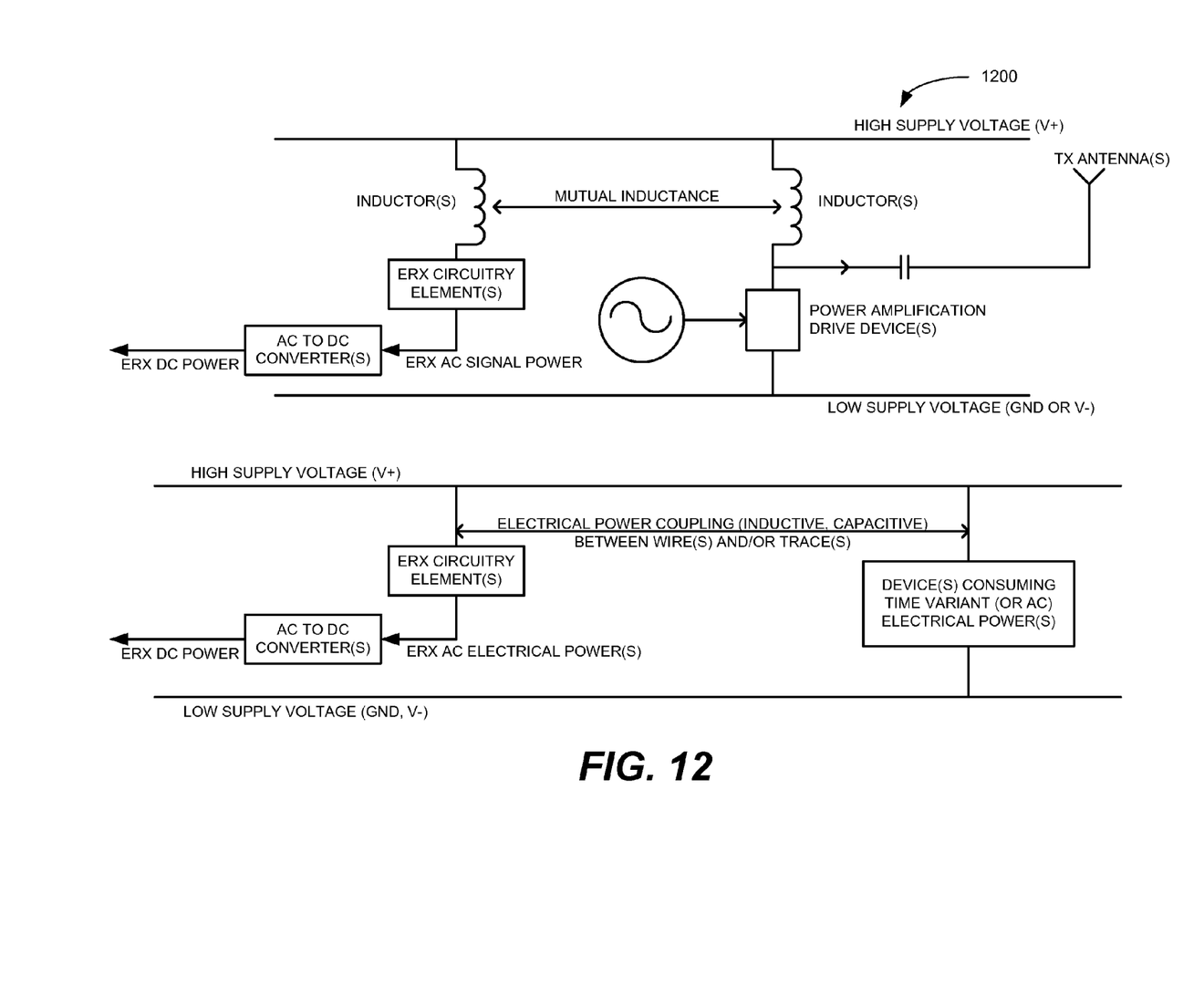
FIG. 12 is a block diagram of an energy receiver in accordance with one implementation.
Figure 13:
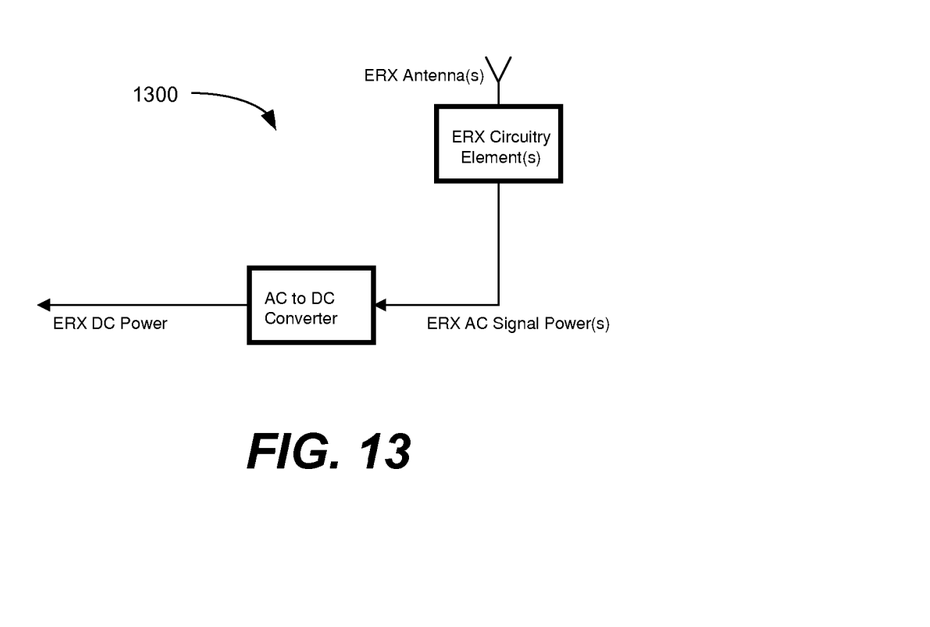
FIG. 13 is a block diagram of multiple energy receivers sharing the same AC to DC converter in accordance with one implementation.

FIG. 12 illustrates one implementation of an energy receiver 1200. In one implementation, the energy receiver can receive AC power though an electrical coupling between electrical components such as, for example, inductors, capacitors, wires, traces, and the like without having to receive a signal transmitted through an antenna. Thus, manufacture of a given wireless device, electrical components can be made to maximize the effect of coupling through careful design—e.g., components, wires, traces can be placed very close to each other to increase an electrical coupling effect—to maximize received AC electrical power. Further, FIG. 13 illustrates another implementation of an energy receiver 1300 in which multiple ERX elements can share a same AC to DC converter.

Figure 14:
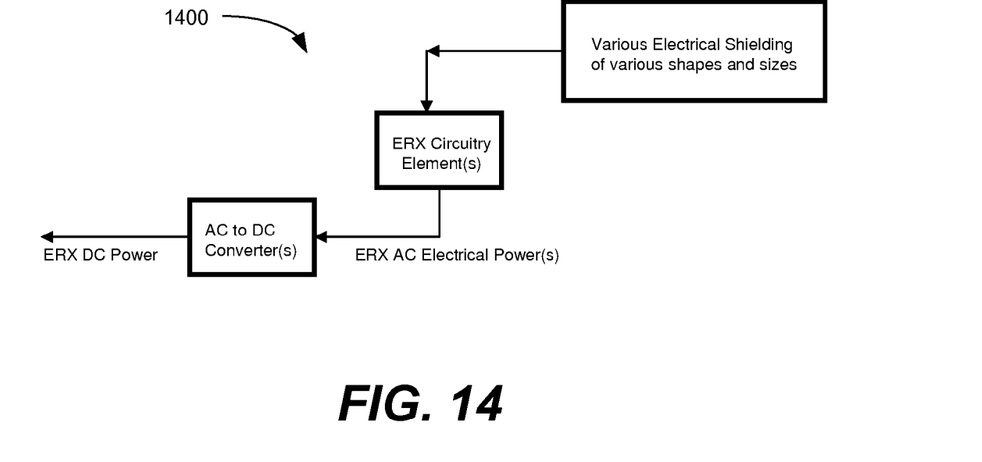
FIG. 14 is a block diagram of an energy receiver coupled to electrical shielding in accordance with one implementation.

FIG. 14 illustrates one implementation of an energy receiver 1400 including ERX Circuitry Element(s) that is further coupled to electrical shielding. Conventionally, electrical shielding is typically used to dissipate electrical energy (e.g., electromagnetic interference (EMI)) to ground. However, in the implementation shown in FIG. 14, the ERX Circuitry Element(s) within the energy receiver 1400 is configured to convert AC electrical energy absorbed by the electrical shielding into DC power for use by components within a wireless device.

One or more of method/algorithm steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 15:
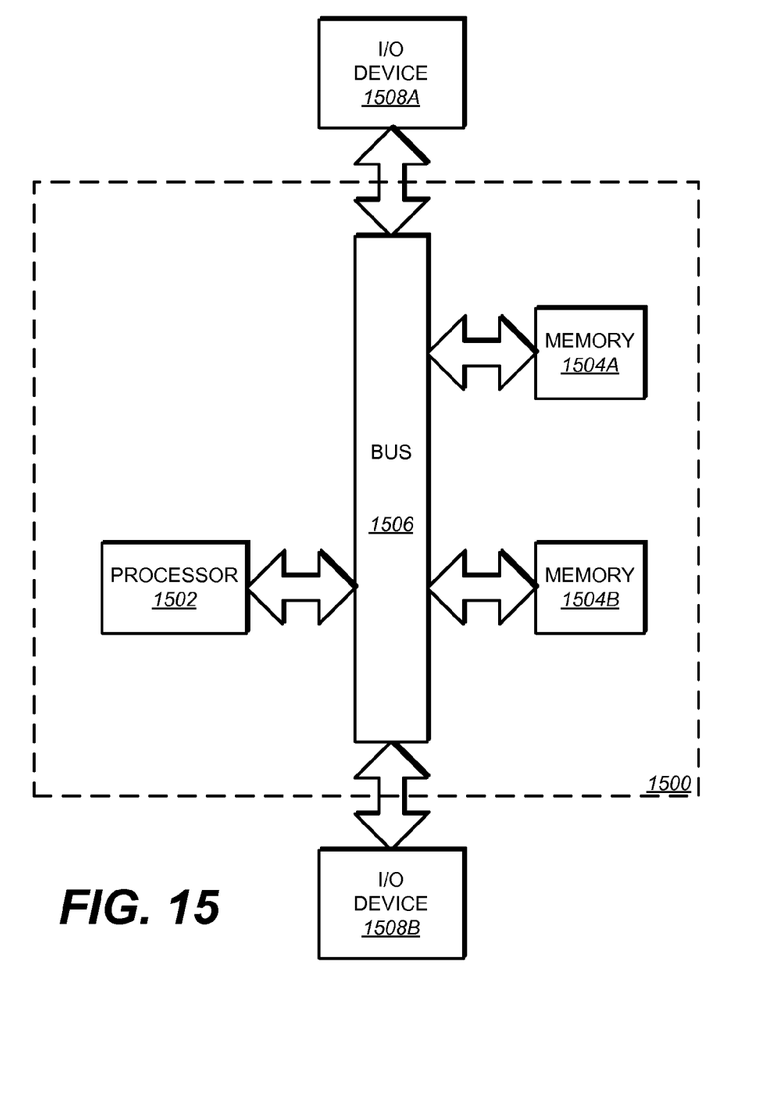
FIG. 15 is a block diagram of a data processing system in accordance with one implementation.

FIG. 15 illustrates a data processing system 1500 suitable for storing and/or executing program code. Data processing system 1500 includes a processor 1502 coupled to memory elements 1504A-B through a system bus 1506. In other implementations, data processing system 1500 may include more than one processor and each processor may be coupled directly or indirectly to one or more memory elements through a system bus. Memory elements 1504A-B can include local memory employed during actual execution of the program code, bulk storage, and cache memories that provide temporary storage of at least some program code in order to reduce the number of times the code must be retrieved from bulk storage during execution. As shown, input/output or I/O devices 1508A-B (including, but not limited to, keyboards, displays, pointing devices, etc.) are coupled to data processing system 1500. I/O devices 1508A-B may be coupled to data processing system 1500 directly or indirectly through intervening I/O controllers (not shown).

Various implementations for enhancing the power efficiency of a wireless communication device have been described. Nevertheless, various modifications may be made to the implementations. For example, though the techniques described above refer to wireless devices, the techniques are applicable to wired devices (including devices that can be connected to an electrical outlet). In addition, steps of the methods/algorithms described above can be performed in a different order and still achieve desirable results. Accordingly, many modifications may be made without departing from the scope of the following claims.

What is claimed is:

1. A method for enhancing the power efficiency of a wireless device having a transmitter and an energy receiver, the method comprising:
   receiving a transmitted signal at the energy receiver of the wireless device, wherein the transmitted signal is transmitted by the transmitter of the wireless device at a pre-determined frequency and is received by an energy receiver included in the first wireless device at the pre-determined frequency, and wherein a distance between the transmitter and the energy receiver is fixed;
   setting a frequency of the energy receiver substantially to the pre-determined frequency;
   converting the transmitted signal received by the energy receiver at the pre-determined frequency into power; and
   supplying the power to a component of the first wireless device.

2. The method of claim 1, wherein setting the frequency of the energy receiver substantially to the pre-determined frequency includes calibrating the energy receiver to substantially match the pre-determined frequency using one or more pre-calibrated control signal values.

3. The method of claim 1, wherein the pre-determined frequency is associated with one or more wireless communication standards selected from the group of GSM, CDMA, WCDMA, Bluetooth, or IEEE 802.11.

4. The method of claim 1, wherein converting the transmitted signal into power further includes converting AC power associated with the transmitted signal received by the energy receiver into DC power through an AC to DC converter.

5. The method of claim 1, wherein the first wireless device is one of a cellular phone, a wireless headset, a personal digital assistant (PDA), a laptop or desktop computer, a router, or a key fob.

6. The method of claim 1, wherein:
   the wireless device further includes an electrical shield to absorb electromagnetic interference (EMI); and
   the method further includes converting the electromagnetic interference (EMI) absorbed through the electrical shield into power through the energy receiver.

7. The method of claim 1, wherein converting the transmitted signal includes setting a frequency of the energy receiver substantially to a centered frequency of a pre-determined frequency range.

8. The method of claim 1, wherein the component is one of a touch pad, a light, a display screen, a digital signal processor, a receiver, a transmitter, or a battery.

9. The method of claim 1, wherein the power is supplied to a power supply for storage therein.

10. A wireless device comprising:
    a transmitter to transmit a signal at a pre-determined frequency;
    an energy receiver configured to receive a signal at the pre-determined frequency including the signal transmitted from the transmitter, convert the signal transmitted from the transmitter into power, and provide the power to a component of the wireless device; and
    a control circuit to set a frequency of the energy receiver to the pre-determined frequency, wherein a distance between the transmitter and the energy receiver is fixed.

11. The wireless device of claim 10, wherein the control circuit is configured to set the frequency of the energy receiver to the pre-determined frequency using one or more pre-calibrated control signal values.

12. The wireless device of claim 10, further comprising: an AC to DC converter to convert AC power associated with the transmitted signal received by the energy receiver into DC power.

13. The wireless device of claim 12, wherein the wireless device is one of a cellular phone, a wireless networking device, a wireless headset, a personal digital assistant (PDA), a laptop or desktop computer, a router, or a key fob.

14. The wireless device of claim 10, wherein the component is one of a touch pad, a light, a display screen, a digital signal processor, a receiver, a transmitter, or a battery.

15. The wireless device of claim 10, wherein the energy receiver is configured to supply power to a power supply for storage therein.

16. A method for enhancing the power efficiency of a first wireless device, the method comprising:
 receiving a first transmitted signal at the first wireless device, wherein the first transmitted signal is transmitted by a transmitter included in the first wireless device and is received by an energy receiver included in the first wireless device;
 receiving a second transmitted signal at the first wireless device, wherein the second transmitted signal is transmitted by a transmitter included in a second wireless device and is received by the energy receiver included in the first wireless device;
 determining whether a power of the first transmitted signal is greater than or less than a power of the second transmitted signal; and
 if the power of the first transmitted signal is greater than the power of the second transmitted signal, then converting the first transmitted signal into power through the energy receiver and providing the power to the first wireless device, or
 if the power of the first transmitted signal is less than the power of the second transmitted signal, then converting the second transmitted signal into power through the energy receiver and providing the power to the first wireless device.

* * * * *